US009191812B2

(12) United States Patent
Escott et al.

(10) Patent No.: US 9,191,812 B2
(45) Date of Patent: *Nov. 17, 2015

(54) APPARATUS AND METHOD FOR TRANSITIONING FROM A SERVING NETWORK NODE THAT SUPPORTS AN ENHANCED SECURITY CONTEXT TO A LEGACY SERVING NETWORK NODE

(71) Applicant: QUALCOMM Incorporated, San Diego, CA (US)

(72) Inventors: Adrian Escott, Reading (GB); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/489,833

(22) Filed: Sep. 18, 2014

(65) Prior Publication Data
US 2015/0043734 A1 Feb. 12, 2015

Related U.S. Application Data

(63) Continuation of application No. 13/084,353, filed on Apr. 11, 2011, now Pat. No. 8,848,916.

(60) Provisional application No. 61/324,991, filed on Apr. 16, 2010.

(51) Int. Cl.
*H04L 29/06* (2006.01)
*H04W 12/04* (2009.01)
(Continued)

(52) U.S. Cl.
CPC ............. *H04W 12/04* (2013.01); *H04L 9/14* (2013.01); *H04W 36/0038* (2013.01); *H04L 2209/24* (2013.01)

(58) Field of Classification Search
CPC .......................... H04W 36/14; H04W 88/06
USPC ............................................. 380/270
See application file for complete search history.

(56) References Cited

U.S. PATENT DOCUMENTS 6,591,364 B1   7/2003 Patel
7,715,822 B2   5/2010 Semple et al.
(Continued)

FOREIGN PATENT DOCUMENTS

CN    101232736 A    7/2008
CN    101304600 A    11/2008
(Continued)

OTHER PUBLICATIONS

3GPP TS 33.401 V8.1.1 (Oct. 2008). Technical Specification 3rd Generation Partnership Project; Technical Specification Group Services and System Aspects; 3GPP System Architecture Evolution (SAE); Security architecture.

(Continued)

*Primary Examiner* — Jason K Gee
(74) *Attorney, Agent, or Firm* — Darren M. Simon

(57) ABSTRACT

Disclosed is a method for transitioning a remote station from a current serving network node having an enhanced security context to a new serving network node. In the method, the remote station provides at least one legacy key, and generates at least one session key based on a calculation using a root key and using an information element associated with the enhanced security context. The remote station forwards a first message having the information element to the new serving network node. The remote station receives a second message, from the new serving network node, having a response based on either the legacy key or the session key. The remote station determines that the new serving network node does not support the enhanced security context if the response of the second message is based on the legacy key. Accordingly, the remote station protects communications based on the legacy key upon determining that the enhanced security context is not supported.

14 Claims, 8 Drawing Sheets

(51) Int. Cl.
*H04W 36/00* (2009.01)
*H04L 9/14* (2006.01)

(56) References Cited

U.S. PATENT DOCUMENTS

| | | | |
|---|---|---|---|
| 7,873,163 B2 | 1/2011 | Quick, Jr. et al. | |
| 8,656,169 B2 | 2/2014 | He | |
| 8,848,916 B2 | 9/2014 | Escott et al. | |
| 2006/0233376 A1 | 10/2006 | Forsberg et al. | |
| 2007/0106620 A1 | 5/2007 | Khandelwal | |
| 2007/0192605 A1* | 8/2007 | Mizikovsky et al. | 713/170 |
| 2007/0230707 A1* | 10/2007 | Blom et al. | 380/277 |
| 2008/0072047 A1* | 3/2008 | Sarikaya et al. | 713/171 |
| 2008/0205650 A1 | 8/2008 | Forsberg | |
| 2008/0292099 A1 | 11/2008 | Gisin et al. | |
| 2008/0305792 A1 | 12/2008 | Khetawat et al. | |
| 2009/0258631 A1 | 10/2009 | Forsberg et al. | |
| 2009/0282253 A1 | 11/2009 | Rose et al. | |
| 2010/0211786 A1 | 8/2010 | Lim et al. | |
| 2010/0304713 A1 | 12/2010 | Bright et al. | |
| 2011/0255691 A1 | 10/2011 | Escott et al. | |
| 2011/0258445 A1 | 10/2011 | Escott et al. | |
| 2011/0311053 A1 | 12/2011 | Escott et al. | |

FOREIGN PATENT DOCUMENTS

| | | | |
|---|---|---|---|
| CN | 101385273 A | 3/2009 | |
| CN | 101406024 A | 4/2009 | |
| CN | 101455054 A | 6/2009 | |
| CN | 101536463 A | 9/2009 | |
| CN | 101606407 A | 12/2009 | |
| CN | 101610147 A | 12/2009 | |
| EP | 1973265 A1 | 9/2008 | |
| EP | 2139260 A1 | 12/2009 | |
| EP | 2205014 A2 | 7/2010 | |
| JP | 2000078669 A | 3/2000 | |
| JP | 2009538567 A | 11/2009 | |
| JP | 2010004412 A | 1/2010 | |
| JP | 2010109954 A | 5/2010 | |
| KR | 20000017575 A | 3/2000 | |
| KR | 20070015770 A | 2/2007 | |
| KR | 20080013906 A | 2/2008 | |
| RU | 2279186 C2 | 6/2006 | |
| RU | 2007114028 A | 10/2008 | |
| WO | WO-0230132 A3 | 9/2002 | |
| WO | WO-03041442 A1 | 5/2003 | |
| WO | WO-2006084183 A1 | 8/2006 | |
| WO | WO-2007111557 A1 | 10/2007 | |
| WO | WO-2007114623 A1 | 10/2007 | |
| WO | WO-2007139794 A2 | 12/2007 | |
| WO | WO-2008048179 A2 | 4/2008 | |
| WO | WO 2008/092999 * | 8/2008 | H04L 9/00 |
| WO | WO-2008092999 A1 | 8/2008 | |
| WO | WO-2009008627 A2 | 1/2009 | |
| WO | WO-2009020281 A1 | 2/2009 | |
| WO | WO-2009020789 A2 | 2/2009 | |

OTHER PUBLICATIONS

3rd Generation Partnership Project (3GPP TM): "3GPP TS 33.401 V8.2.1 (Dec. 2008), 3rd Generation Partnership Project; Technical Specification Group Services and System Aspects; 3GPP System Architecture Evolution (SAE): Security Architecture", Dec. 19, 2008, 3GPP TS 33.401 V8.2.1, pp. 1-58, XP002574135.

"3rd Generation Partnership Project; Technical Specification Group Services and System Aspects; 3G Security; Security architecture (Release 6)", 3GPP Standard; 3GPP TS 33.102, 3rd Generation Partnership Project (3GPP), Mobile Competence Centre ; 650, Route Des Lucioles ; F-06921 Sophia-Antipolis Cedex ; France, No. V6.2.0, Sep. 1, 2004, pp. 1-62, XP050376414.

3rd Generation Partnership Project; Technical Specification Group Services and System Aspects; 3GPP System Architecture Evolution (SAE); Security architecture (Release 9), 3GPP Standard; 3GPP TS 33.401, 3rd Generation Partnership Project (3GPP), Mobile Competence Centre ; 650, Route Des Lucioles ; F-06921 Sophia-Antipolis Cedex ; France, No. V9.3.1, Apr. 14, 2010, pp. 1-104, XP050402537, [retrieved on Apr. 14, 2010] p. 29, line 1—p. 33, line 38 figures 6.2-1.

Huawei: "Start/NAS Count relay on Inter-RAT mobility", S3-090918, 3GPP, May 15, 2009, pp. 1-2.

International Search Report and Written Opinion—PCT/US2011/032754, ISA/EPO—Jul. 15, 2011.

Lei Z, et al., "Design of a High Security GSM/UMTS Inter-System", 2009 1st International Conference on Information Science and Engineering (ICISE 2009)—Dec. 26-28, 2009—Nanjing, China, IEEE, Piscataway, NJ, USA, Dec. 26, 2009, pp. 1703-1706, XP031663041, ISBN: 978-1-4244-4909-5.

Pope M., et al., "Study on the Introduction of Key Hierarchy in UTRAN", S3-091157, 3GPP, May 15, 2009, pp. 1-14.

Pope M., et al., "Study on the Introduction of Key Hierarchy in UTRAN", S3-100319, 3GPP, Feb. 14, 2010, pp. 1-17.

Qualcomm Incorporated: "Proposal for UTRAN KH solution 2 interworking with E-UTRAN", 3GPP Draft; S3-100855, 3rd Generation Partnership Project (3GPP), Mobile Competence Centre ; 650, Route Des Lucioles ; F-06921 Sophia-Antipolis Cedex ; France, vol. SA WG3, No. Montreal; Jul. 2, 2010, Jun. 21, 2010, XP050460030, [retrieved on 2010-06-211 paragraphs [5.2.2] , [5.2.y.4.3].

Taiwan Search Report—TW100113220—TIPO—Jun. 12, 2014.

Universal Mobile Telecommunications System (UMTS); LTE; 3G security; Security architecture (3GPP TS 33.102 version 8.1.0 Release 8); ETSI TS 133 102, Jan. 1, 2009, ETSI Standard, European Telecommunications Standards Institute (ETSI ), Sophia Antipolis Cedex, France, XP014043538.

Wang H., et al., "Security context transfer in vertical handover", Personal, Indoor and Mobile Radio Communications, 2003, PIMRC 2003, 14th IEEE Proceedings on Sep. 7-10, 2003, IEEE, Piscataway, NJ, USA, vol. 2, Sep. 7, 2003, pp. 2775-2779, XP010678137, DOI:10.1109/PIMRC.2003.1259248 ISBN: 978-0-7803-7822-3.

* cited by examiner

APPARATUS AND METHOD FOR TRANSITIONING FROM A SERVING NETWORK NODE THAT SUPPORTS AN ENHANCED SECURITY CONTEXT TO A LEGACY SERVING NETWORK NODE

CROSS-REFERENCE TO RELATED APPLICATIONS

This application is a continuation of U.S. patent application Ser. No. 13/084,353, filed Apr. 11, 2011, which application claims the benefit of U.S. Provisional Application No. 61/324,991, filed Apr. 16, 2010, which applications are incorporated herein by reference.

This application is related to U.S. Provisional Application No. 61/324,646, filed Apr. 15, 2010, and to U.S. Provisional Application No. 61/325,001, filed Apr. 16, 2010.

BACKGROUND

1. Field

The present invention relates generally to an enhanced security context for user equipment operating in a Universal Mobile Telecommunications Service (UMTS), GSM Edge Radio Access Network (GERAN), and/or Long Term Evolution (LTE) or Evolved UTRAN (E-UTRAN).

2. Background

A successful AKA (Authentication and Key Agreement) authentication in a LTE fourth generation (4G) network or (UMTS third generation (3G) radio access network or in a GERAN networks using 3G AKA authentication results in a pair of shared keys, a cipher key (CK) and an integrity key (IK), for securing communications between a user equipment (UE) and the network. The shared keys may be used directly to secure the traffic between the UE and the network as in the case of UTRAN (UMTS Terrestrial Radio Access Network), or may be used to statically derive keys, e.g., $K_{ASME}$ or keys derived from it, in the case of E-UTRAN and $K_C$ or $K_{C128}$, in the case of GERAN (GSM Edge Radio Access Network).

A compromised key may result in serious security problems until the keys are changed at a next AKA authentication. Typically, the AKA authentication is not run often due to the significant overhead required. Also, if both keys (CK and IK) are compromised, then the keys used between the UE and the serving Radio Access Network may also get compromised.

In UMTS/HSPA (High Speed Packet Access) deployments, some or all of functionalities of a radio network controller (RNC) and a Node B may be collapsed together into one node at the edge of the network. The RNC needs the keys for functionalities such as user plane ciphering and signaling plane ciphering and integrity protection. However, the RNC functionality may be deployed in an exposed location such as in a Home Node B in a UMTS Femtocell. Accordingly, RNC functionality deployed in possibly insecure locations providing access (including physical access) may allow the keys, CK and IK, to be compromised.

Session keys (modified version of CK and IK) may be used to lower the security risks associated with exposed RNC functionality. Techniques for providing such session keys are disclosed in U.S. Patent Application Publication No. US 2007/0230707 A1.

Unfortunately, the use of such session keys require upgrade modifications to the serving networks. However, networks operators are likely to upgrade serving networks in a staged manner.

There is therefore a need for a technique for a remote station to interoperate with serving network nodes supporting an enhanced security context and with legacy serving network nodes.

SUMMARY

An aspect of the present invention may reside in a method for transitioning a remote station from a current serving network node having a first security context to a new serving network node. In the method, the remote station provides at least one legacy key associated with a second security context, wherein the first security context includes a security property that is not supported by the second security context. The remote station generates at least one session key, in accordance with the first security context, based on a calculation using a root key and using an information element associated with the first security context. The remote station forwards a first message to the new serving network node. The first message includes the information element associated with the first security context. The remote station receives, in response to the first message, a second message from the new serving network node. The second message has a response based on either the at least one legacy key or the at least one session key. The remote station determines that the new serving network node does not support the first security context if the response of the second message is based on the at least one legacy key. Accordingly, the remote station protects communications based on the at least one legacy key upon determining that the new serving network node does not support the first security context.

In more detailed aspects of the invention, the information element may comprise a count value. The count value may be updated for a session. The first security context may be an enhanced UMTS security context, and the second security context may be a legacy security context. The second message may include a message authentication code (MAC), and the remote station may determine that the response is based on the at least one legacy key by determining that the MAC was calculated using the at least one legacy key. The remote station may comprise a mobile user equipment Another aspect of the invention may reside in a remote station which may include means for providing at least one legacy key associated with a second security context, wherein a first security context of a current serving network node includes a security property that is not supported by the second security context; means for generating at least one session key, in accordance with the first security context, based on a calculation using a root key and using an information element associated with the first security context; means for forwarding a first message to a new serving network node, wherein the first message includes the information element signaling associated with the first security context; means for receiving, in response to the first message, a second message from the new serving network node, wherein the second message has a response based on either the at least one legacy key or the at least one session key; means for determining that the new serving network node does not support the first security context if the response of the second message is based on the at least one legacy key; and means for protecting communications based on the at least one legacy key upon determining that the new serving network node does not support the first security context.

Another aspect of the invention may reside in a remote station which may include a processor configured to: provide at least one legacy key associated with a second security context, wherein a first security context of a current serving network node includes a security property that is not supported by the second security context; generate at least one session key, in accordance with the first security context, based on a calculation using a root key and using an information element associated with the first security context; forward a first message to a new serving network node, wherein the first message includes the information element associated with the first security context; receive, in response to the first message, a second message from the new serving network node, wherein the second message has a response based on either the at least one legacy key or the at least one session key; determine that the new serving network node does not support the first security context if the response of the second message is based on the at least one legacy key; and protect communications based on the at least one legacy key upon determining that the new serving network node does not support the first security context.

Another aspect of the invention may reside in a computer program product, comprising non-transitory computer-readable storage medium, comprising code for causing a computer to provide at least one legacy key associated with a second security context, wherein a first security context of a current serving network node includes a security property that is not supported by the second security context; code for causing a computer to generate at least one session key, in accordance with the first security context, based on a calculation using a root key and using an information element associated with the first security context; code for causing a computer to forward a first message to a new serving network node, wherein the first message includes the information element associated with the first security context; code for causing a computer to receive, in response to the first message, a second message from the new serving network node, wherein the second message has a response based on either the at least one legacy key or the at least one session key; code for causing a computer to determine that the new serving network node does not support the first security context if the response of the second message is based on the at least one legacy key; and code for causing a computer to protect communications based on the at least one legacy key upon determining that the new serving network node does not support the first security context.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 2:
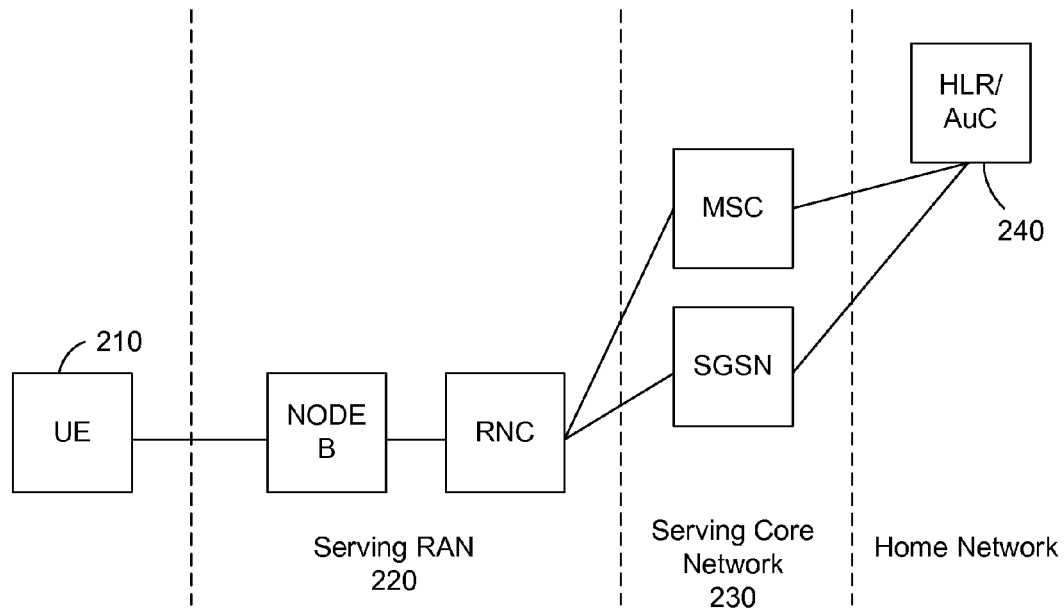
FIG. 2 is a block diagram of an example of a wireless communication system in accordance with a UMTS/UTRAN architecture.
Figure 3:
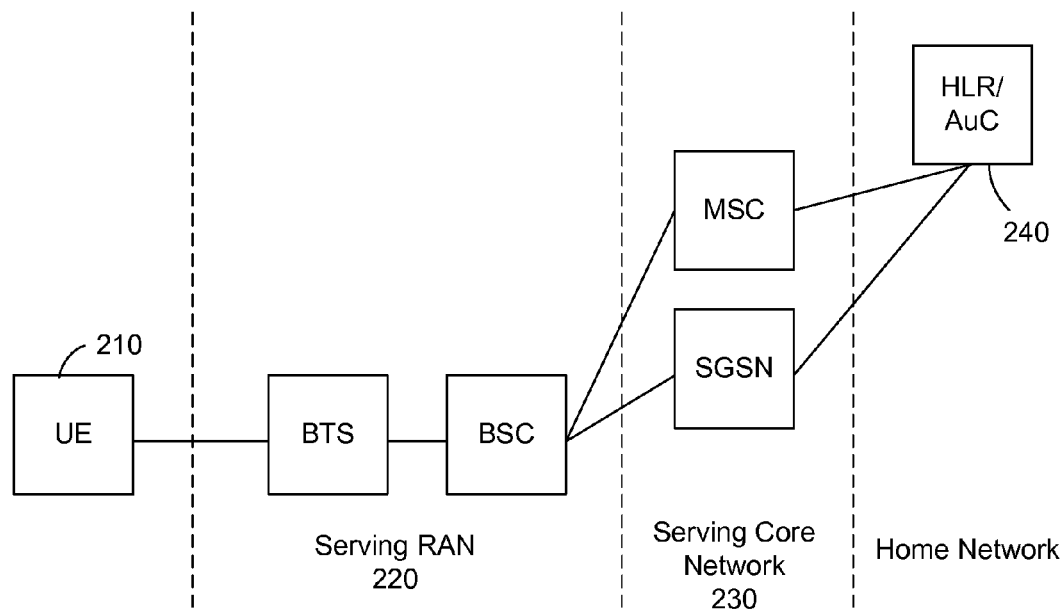
FIG. 3 is a block diagram of an example of a wireless communication system in accordance with a GERAN architecture.
Figure 4:
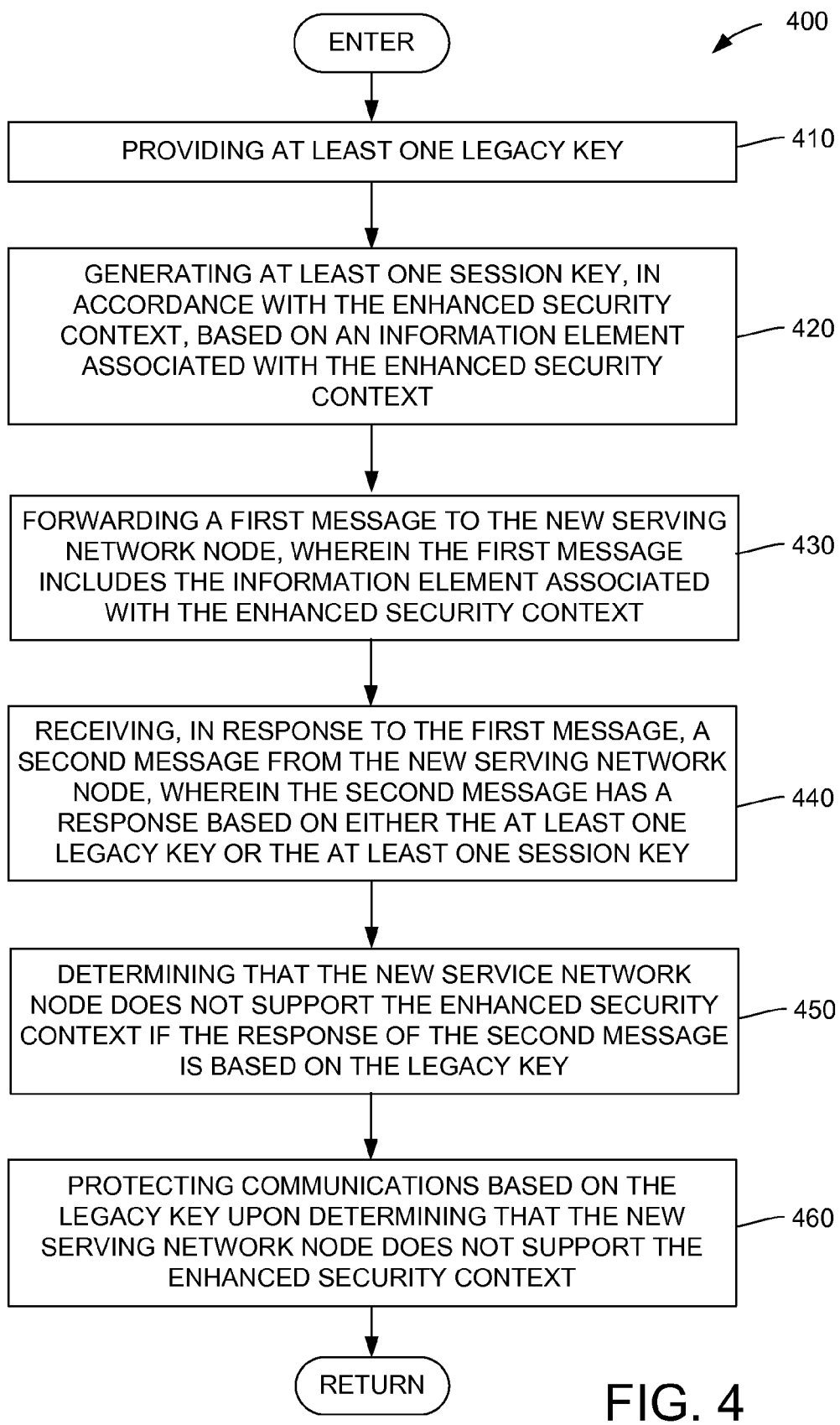
FIG. 4 is a flow diagram of a method for transitioning a remote station from a serving network node having an enhanced security context to a new serving network node.

With reference to FIGS. 2 though 4, an aspect of the present invention may reside in a method 400 for transitioning a remote station 210 from a serving network node 230 having an enhanced security context to a new serving network node 230'. In the method, the remote station provides at least one legacy key (step 410) and generates at least one session key, in accordance with the enhanced security context, based on an information element associated with the enhanced security context (step 420). The remote station forwards a first message to the new serving network node (step 430). The first message includes the information element associated with the enhanced security context. The remote station receives, in response to the first message, a second message from the new serving network node (step 440). The second message has a response based on either the at least one legacy key or the at least one session key. The remote station determines that the new serving network node does not support the enhanced security context if the response of the second message is based on the legacy key (step 450). Accordingly, the remote station protects communications based on the legacy key upon determining that the new serving network node does not support the enhanced security context (step 460). The information element may comprise a count value.

Figure 8:
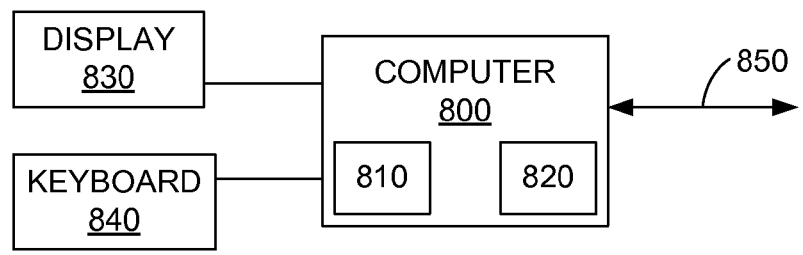
FIG. 8 is a block diagram of a computer including a processor and a memory.

With further reference to FIG. 8, another aspect of the invention may reside in a remote station 210 which may include means (processor 810) for providing at least one legacy key; means for generating at least one session key, in accordance with an enhanced security context, based on an information element associated with the enhanced security context; means for forwarding a first message to a new serving network node, wherein the first message includes the information element signaling associated with the enhanced security context; means for receiving, in response to the first message, a second message from the new serving network node, wherein the second message has a response based on either the at least one legacy key or the at least one session key; means for determining that the new serving network node does not support the enhanced security context if the response of the second message is based on the legacy key; and means for protecting communications based on the legacy key upon determining that the new serving network node does not support the enhanced security context.

Another aspect of the invention may reside in a remote station 210 which may include a processor 810 configured to: provide at least one legacy key; generate at least one session key, in accordance with an enhanced security context, based on an information element associated with the enhanced security context; forward a first message to a new serving network node, wherein the first message includes the information element associated with the enhanced security context; receive, in response to the first message, a second message from the new serving network node, wherein the second message has a response based on either the at least one legacy key or the at least one session key; determine that the new serving network node does not support the enhanced security context if the response of the second message is based on the legacy key; and protect communications based on the legacy key upon determining that the new serving network node does not support the enhanced security context.

Another aspect of the invention may reside in a computer program product, comprising computer-readable storage medium 820, comprising code for causing a computer 800 to provide at least one legacy key; code for causing a computer to generate at least one session key, in accordance with the enhanced security context, based on an information element associated with the enhanced security context; code for causing a computer to forward a first message to a new serving network node, wherein the first message includes the information element associated with the enhanced security context; code for causing a computer to receive, in response to the first message, a second message from the new serving network node, wherein the second message has a response based on either the at least one legacy key or the at least one session key; code for causing a computer to determine that the new serving network node does not support the enhanced security context if the response of the second message is based on the legacy key; and code for causing a computer to protect communications based on the legacy key upon determining that the new serving network node does not support the enhanced security context.

The serving core network 230 is connected to a serving RAN (Radio Access Network) 220 which provides wireless communications to the remote station 210. In a UMTS/UTRAN architecture, the serving RAN includes a Node B and a RNC (Radio Network Controller). In a GERAN architecture, the serving RAN includes a BTS (Base Transceiver Station) and a BSC (Base Station Controller). The serving core network includes an MSC/VLR (Mobile Switching Center/Visitor Location Register) for providing circuit-switched (CS) service, and an SGSN (Serving GPRS Support Node) for providing packet-switched (PS) services. The home network includes an HLR (Home Location Register) and an AuC (Authentication Center).

The UE 210 and the serving core network 230 may be enhanced with new security properties to create an enhanced UMTS security context (ESC) using a COUNT (counter value). A 256-bit root key ($K_{ASMEU}$) for the ESC may be derived from the CK and IK when AKA authentication is performed. The root key may be set equal to CK∥IK, or it may be derived using a more complex derivation resulting in additional useful security properties (e.g., CK and IK do not need to be kept). The COUNT may be a 16-bit counter value that is maintained between the UE and the serving core network. (Note: a legacy UTRAN security context consists of KSI (a 3-bit Key Set Identifier), CK (a 128-bit encryption key), and IK (a 128-bit integrity key).

The present invention provides a technique to smoothly fallback to legacy nodes from enhanced nodes. Mobile equipment/User Equipment that supports the ESC may be designated UE+. An SGSN and an MSC/VLR that supports ESC may be designated SGSN+ and MSC/VLR+. The ESC is an example of the first security context. (A legacy SGSN and MSC/VLR are indicated without the plus sign.) The method for fallback to legacy nodes is independent of the method used to determine the session keys. Not supporting the ESC is an example of the second security context.

Figure 10:
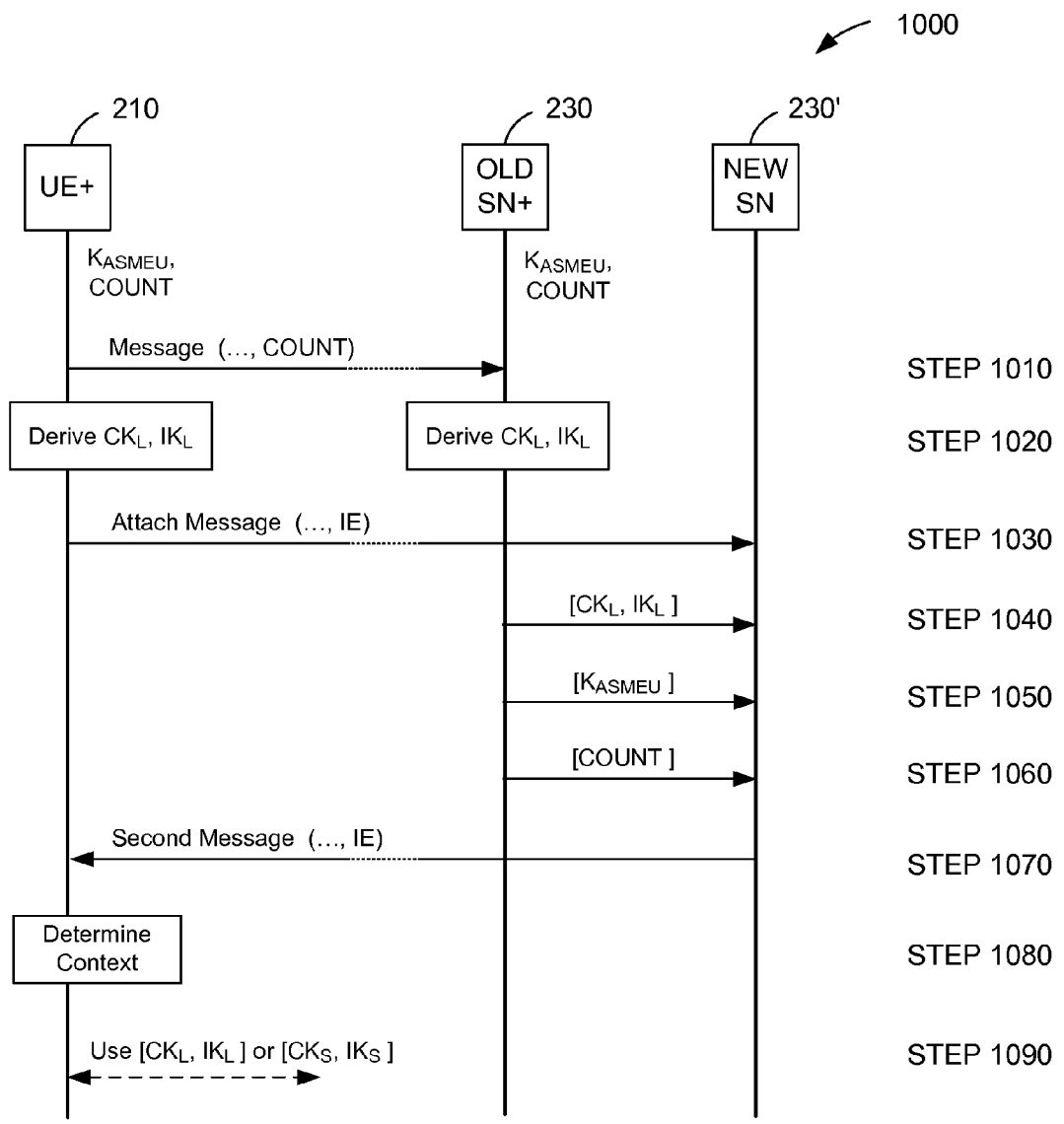
FIG. 10 is a flow diagram of a method for transitioning a remote station from a serving network node having an enhanced security context to a new serving network node.

With reference to FIG. 10, the UE+ 210 and the SGSN+ or MSC/VLR+ share the ESC which includes KSI (key set identifier) as currently used in UMTS/GERAN, and the root key $K_{ASMEU}$. The session keys $CK_S$ and $IK_S$ are calculated from the root key $K_{ASMEU}$ and the parameter (e.g., the COUNT value) exchanged between the UE+ and the SGSN+ or MSC/VLR+ (step 1010). The SGSN+ 230 or MSC/VLR+ also derive $CK_L$ and $IK_L$ (step 1020), which function as legacy keys, from $K_{ASMEU}$ and fixed parameters such that $CK_L$ and $IK_L$ are cryptographically independent of each other, i.e., knowing $CK_L$ and $IK_L$ does not reveal $K_{ASMEU}$.

During idle mobility, or when the UE+ attaches to a new serving network (step 1030), the ESC parameters may be moved from an SGSN+ 230 or MSC/VLR+ to a target SGSN 230' or MSC/VLR that does not support the ESC. For UE+ mobility to such a target node, the source SGSN+ or MSC/VLR+ includes $CK_L$ and $IK_L$ in the Information Elements (IEs) that carry the legacy IK and CK (i.e., in the existing CK/IK IEs) (step 1040. $K_{ASMEU}$ is in a new IE (step 1050). The COUNT value is also provided to the target to permit derivation of session keys (step 1060). If the target SGSN or MSC/VLR that does not support the ESC, it will ignore the new IEs and use $CK_L$ and $IK_L$ as the legacy CK and IK.

The UE+ includes in its messages to the target the relevant information to calculate the session keys. The UE+ does not know yet whether the target supports the ESC. If the target is a legacy node (e.g., does not understand the ESC), then it uses $CK_L$ and $IK_L$ received from the source SGSN+ or MSC/VLR+ as the legacy UMTS security context (along with KSI/CKSN). If the target supports the ESC, then it can continue the use of the ESC. The target SGSN+ or MSC/VLR+ signals its support of the ESC to the UE.

In UMTS, the UE+ may receive the SMC (security mode command) from the RNC without knowing whether the target supports the ESC (step 1070). In this case, the UE+ uses both the $IK_L$ and $IK_S$ to determine whether the ESC is supported by the target SGSN (or MSC/VLR) (step 1080). More specifically, the UE+ calculates the MAC for the SMC using both $IK_L$ and $IK_S$. The UE+ checks the calculated MAC with the MAC value included in the SMC. If the received MAC is equal to the MAC calculated with $IK_S$, then the target supports the ESC. If the received MAC is equal to the MAC calculated with $IK_L$, then the target does not support the ESC (step 1090). Otherwise, the UE+ rejects the received message (e.g., SMC) due to integrity failure.

In GERAN PS, the SGSN+ signals its support of the ESC in the Authentication and Ciphering message. In GERAN CS, if security is enabled before signaling of MSC capabilities can be received by the UE+, GERAN key $K_C$ or $K_{C128}$ derived from $CK_L$ and $IK_L$ may be used temporarily until a switch is possible.

If the target SGSN or MSC/VLR does not support the ESC, both the target and the UE+ fall back to using a legacy security context with $CK_L$ and $IK_L$ as the CK and IK.

Alternatively, the target could signal support for the ESC in the SMC (e.g., by adding a new IE that the RNC received from the SGSN+ or MSC/VLR+). If no indication is received, the UE+ may assume it is communicating with a legacy SGSN or MSC/VLR. This alternative enhancement requires changes to the RNC (i.e., the RNC has to upgraded to send the SMC's with the new IEs).

In Connected Mode (active mode) mobility, it is not possible for the UE+ to determine the capability of the target SGSN (e.g., SMC is not possible in connected mode or it will result in a break in the on-going call/session, which is not preferable).

If the SGSN is changed in the connected mode, then the source SGSN includes $CK_S$ and $IK_S$ in the legacy CK and IK IEs. Both the target SGSN and the UE+ realize that the target SGSN only supports a legacy context through subsequent signaling (e.g., idle mode or service requests or SMC) and will fallback to a legacy security context with $CK_S$ and $IK_S$. This is different from idle mode where $CK_L$ and $IK_L$ are used as the IK and CK by the legacy nodes. If the target SGSN+ supports the ESC, it uses the root key $K_{ASMEU}$ to derive the ESC as described before.

Figure 5:
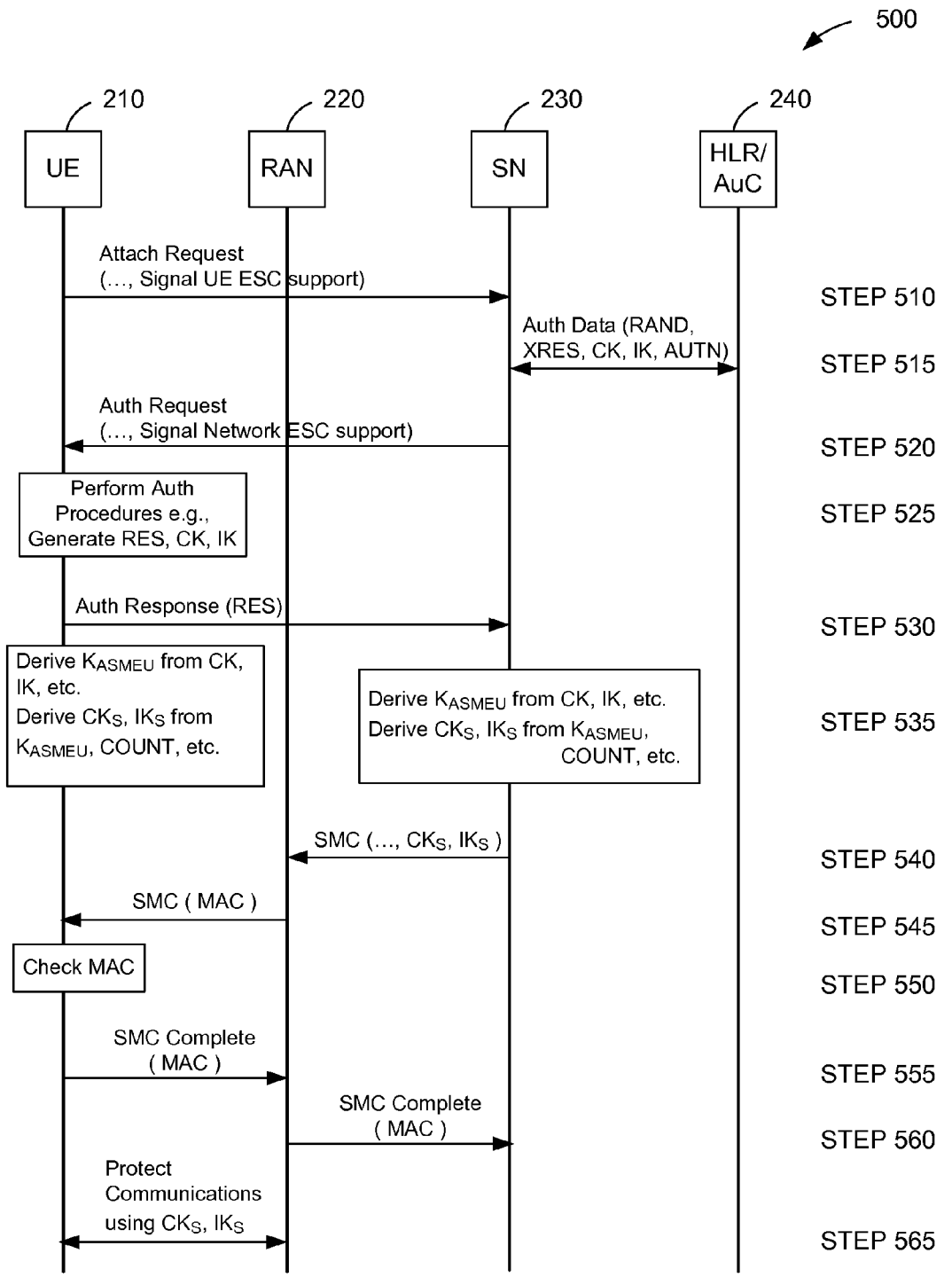
FIG. 5 is a flow diagram of a method for establishing an enhanced security context between a remote station and a serving network based on an attach request message.

With reference to FIG. 5, in a method 500 related to UMTS attach procedures, the UE 210 may signal that it supports ESC in a UMTS attach request message (step 510). The support signal may be the presence of a new information element (IE) in the message. The IE may comprise the COUNT value. A serving network SN 230 that does not support ESC will ignore the new IE. Authentication data (RAND, XRES, CK, IK, AUTN) is obtained from the HLR/AuC 240 (step 515). The SN may indicate ESC support in the AKA challenge (Authentication Request) to the UE (step 520). The UE performs the authentication procedures (step 525) and returns a response RES to the SN (step 530). Upon successful authentication (step 530), the UE and SN derive the root key $K_{ASMEU}$ and the session keys $CK_S$ and $IK_S$ (step 535). The SN forwards the session keys to the RAN 220 in an SMC (Security Mode Command) message (step 540). The RAN generates a message authentication code (MAC) using the session key $IK_S$, which is forwarded to the UE in an SMC message (step 545). The UE checks the MAC (step 550) using the session key $IK_S$ that the UE derived (step 535), and returns a complete indication to the RAN (step 555), which forwards it to the SN (step 560). The UE is then able to protect communications using the session keys (step 565).

Figure 6:
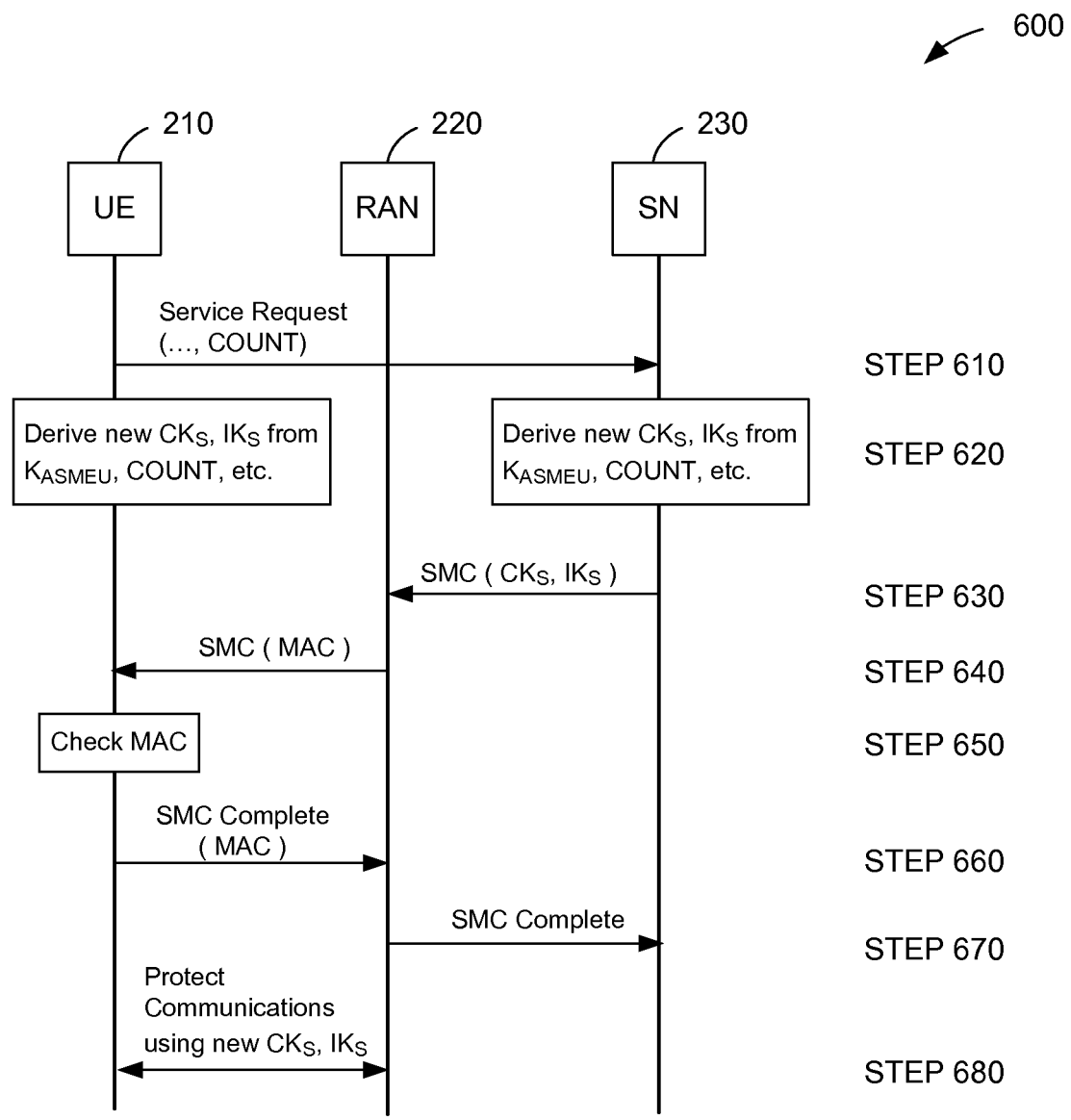
FIG. 6 is a flow diagram of a method for establishing at least one session key from an enhanced security context between a remote station and a serving network based on a service request message.

With reference to FIG. 6, in a method 600 related to an Idle to Active Mode procedure 600, the UE 210 forwards a service request message which includes the COUNT value to the SN 230 (step 610). The UE and SN derive new the session keys $CK_S$ and $IK_S$ from the root key $K_{ASMEU}$ (step 620). The SN forwards the session keys to the RAN 220 in an SMC message (step 630). The RAN generates a MAC, which is forwarded to the UE in an SMC message (step 640). The UE checks the MAC (step 650), and returns a complete indication to the RAN (step 660), which forwards it to the SN (step 670). The UE is then able to protect communications using the session keys (step 680).

Figure 7:
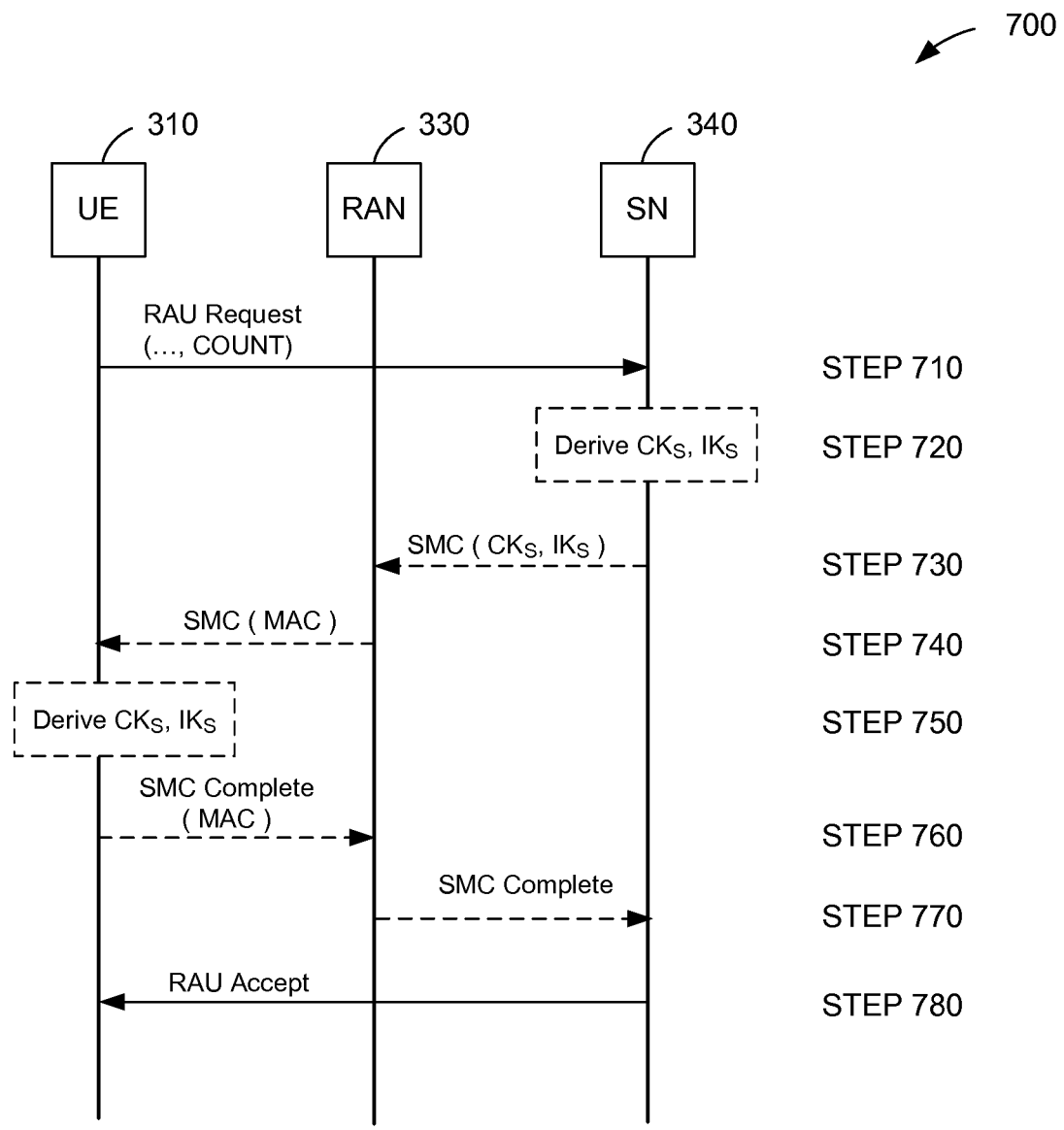
FIG. 7 is a flow diagram of a method for establishing at least one session key from an enhanced security context between a remote station and a serving network based on a routing area update request message.

With reference to FIG. 7, in a method 700 related to mobility management procedures 700 (such as a Routing Area Update (RAU) or Location Area Update (LAU), the UE 210 forwards a RAU (or LAU) request message which includes the COUNT value to the SN 230 (step 710). Optionally, the UE and SN may derive new the session keys $CK_S$ and $IK_S$ from the root key $K_{ASMEU}$ (step 720) The SN may forward the session keys to the RAN 220 in an SMC message (step 730). The RAN may generate a MAC, which may be forwarded to the UE in an SMC message (step 740). The UE may check the MAC (step 750), and may return a complete indication to the RAN (step 760), which forwards it to the SN (step 770). The SN then sends a RAU accept message to the UE (step 780). The UE is then able to protect communications using the session keys.

New access stratum (AS) keys may be generated for each transition from Idle to Active State. Similarly, keys may be generated at other events. The COUNT value may be sent in idle mobility messages and in initial layer 3 messages, e.g., Attaches, RAUs, LAUs, for idle, mobility, or service request. The SN may check that the sent COUNT value has not been used before, and updates the stored COUNT value in the process. If the COUNT value is new (e.g., received COUNT value>stored COUNT value), the UE and the SN proceed to calculate the new key $CK_S$ and $IK_S$, using a Key Derivation Function (KDF) such as HMAC-SHA256, from the root key $K_{ASMEU}$ and the sent COUNT value. The KDF may include additional information, such as RAN node identity, for the new key calculation. If the check fails (the COUNT value is not new), the SN rejects the message. For GERAN usage, when $K_C$ and $K_{C128}$ are calculated from $CK_S$ and $IK_S$, it may be done in the same manner as when calculated from CK and IK.

The session keys ($CK_S$ and $IK_S$) may have a lifetime such that the UE and the serving network keep and use the session keys until either it is no longer necessary to store the keys to send traffic securely between the UE and the network (UE moves to Idle mode), or a new context is created at a subsequent event (e.g., AKA authentication or a mobility event).

Figure 9:
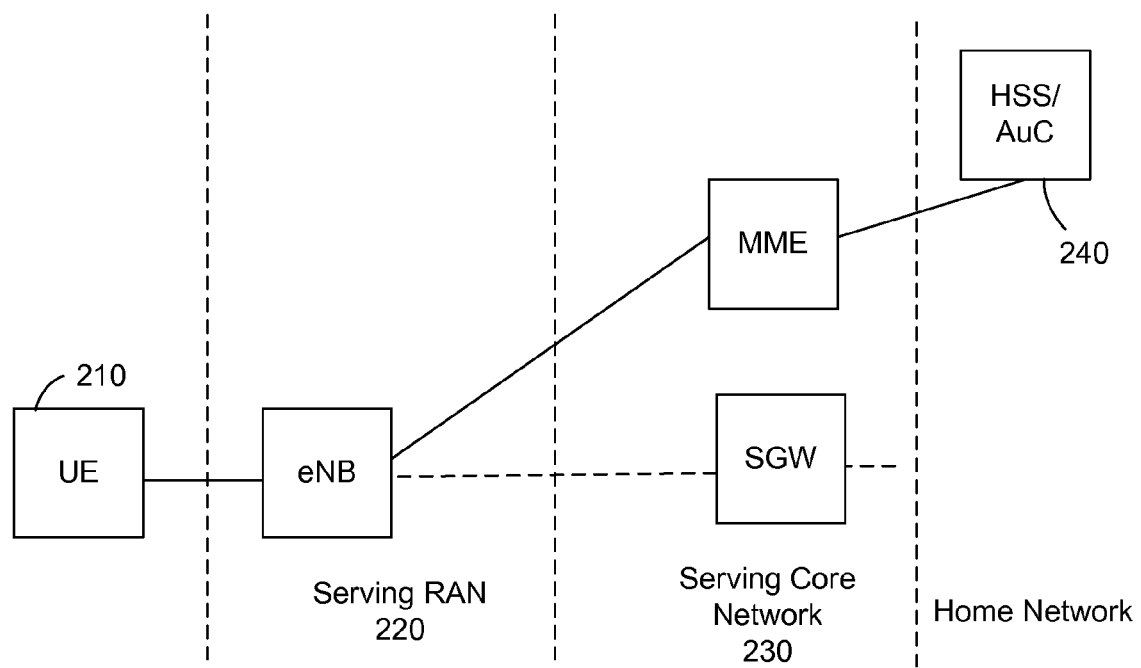
FIG. 9 is a block diagram of an example of a wireless communication system in accordance with an E-UTRAN architecture.

The procedures described above can also be used to smoothly fallback to legacy nodes when the UE+ is transitioning from E-UTRAN (FIG. 9) to UTRAN/GERAN, When transitioning from E-UTRAN to UTRAN/GERAN, the Mobility Management Entity (MME) sends to SGSN/SGSN+ both the 256-bit key called $K_{ASME}$ and a pair of keys called cipher key (CK') and integrity keys (IK') derived from $K_{ASME}$. An SGSN will treat CK' as the legacy CK and the IK' as the legacy IK, and ignore the $K_{ASME}$, whereas an SGSN+ will treat $K_{ASME}$ as it's $K_{ASMEU}$ and CK' as it's $CK_S$ and IK' as it $IK_S$. It should be noted here that MME and E-UTRAN will be considered as an enhanced serving network as the security context transferred from E-UTRAN is always considered as the enhanced security context.

The remote station 210 may comprise a computer 800 that includes a storage medium 820 such as memory, a display 830, and an input device 840 such as a keyboard. The apparatus may include a wireless connection 850.

Figure 1:
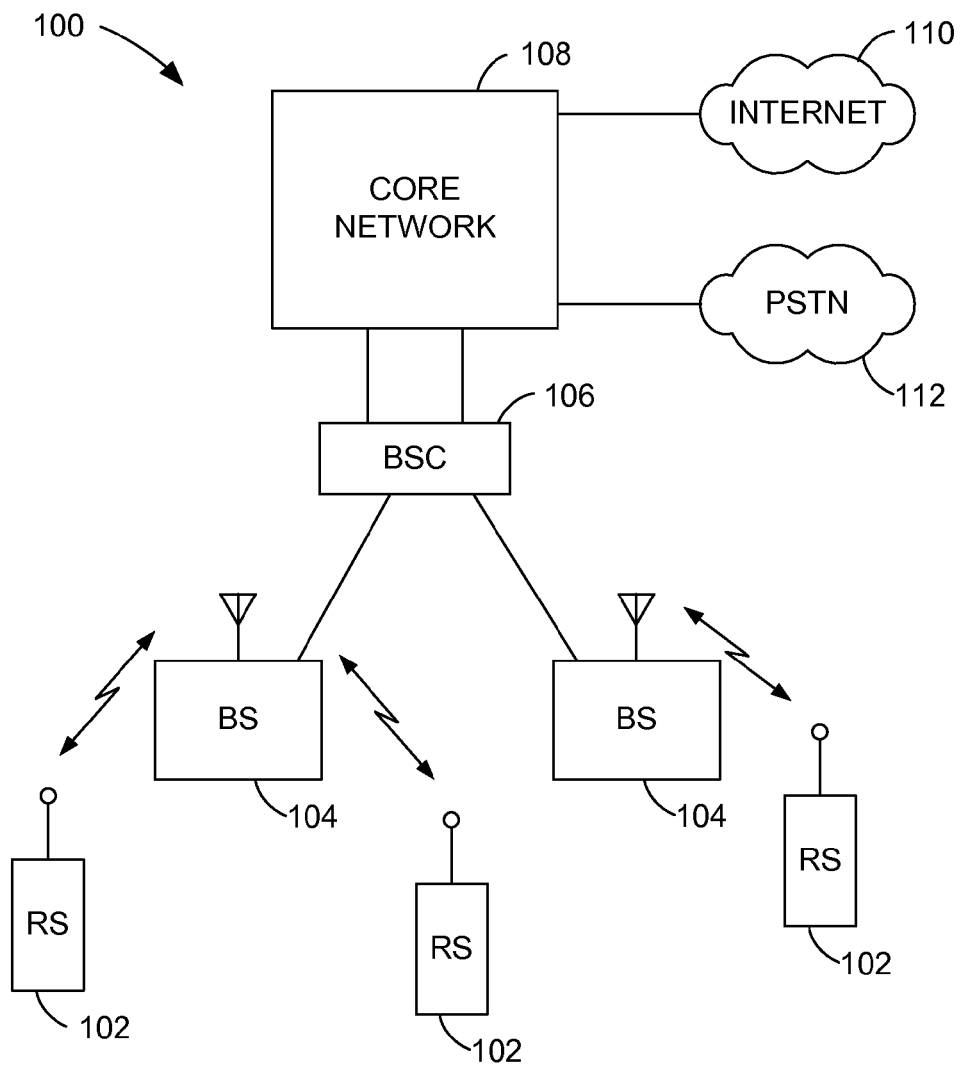
FIG. 1 is a block diagram of an example of a wireless communication system.

With reference to FIG. 1, a wireless remote station (RS) 102 (or UE) may communicate with one or more base stations (BS) 104 of a wireless communication system 100. The wireless communication system 100 may further include one or more base station controllers (BSC) 106, and a core network 108. Core network may be connected to an Internet 110 and a Public Switched Telephone Network (PSTN) 112 via suitable backhauls. A typical wireless remote station may include a handheld phone, or a laptop computer. The wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

A wireless device 102 may include various components that perform functions based on signals that are transmitted by or received at the wireless device. For example, a wireless headset may include a transducer adapted to provide an audio output based on a signal received via the receiver. A wireless watch may include a user interface adapted to provide an indication based on a signal received via the receiver. A wireless sensing device may include a sensor adapted to provide data to be transmitted to another device.

A wireless device may communicate via one or more wireless communication links that are based on or otherwise support any suitable wireless communication technology. For example, in some aspects a wireless device may associate with a network. In some aspects the network may comprise a body area network or a personal area network (e.g., an ultrawideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical device (e.g., a biometric sensor, a heart rate monitor, a pedometer, an EKG device, etc.), a user I/O device (e.g., a watch, a remote control, a light switch, a keyboard, a mouse, etc.), a tire pressure monitor, a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for transitioning a remote station from a current serving network node having a first security context to a new serving network node, comprising:
    providing, by the remote station, at least one legacy key associated with a second security context, wherein the first security context includes a security property that is not supported by the second security context;
    generating, by the remote station, at least one session key, in accordance with the first security context, based on a calculation using a root key and using an information element associated with the first security context;
    forwarding, by the remote station, a first message to the new serving network node, wherein the first message includes the information element associated with the first security context;
    receiving, by the remote station in response to the first message, a second message from the new serving network node, wherein the second message has a response based on either the at least one legacy key or the at least one session key;
    determining, by the remote station, that the new serving network node does not support the first security context if the response of the second message is based on the at least one legacy key; and
    protecting, by the remote station, communications based on the at least one legacy key upon determining that the new serving network node does not support the first security context.

2. The method of claim 1, wherein the information element comprises a count value.

3. The method of claim 1, wherein the first security context is an enhanced UMTS security context, and the second security context is a legacy security context.

4. The method of claim 1, wherein the remote station comprises a mobile user equipment.

5. The method of claim 1, wherein the second message includes a message authentication code (MAC), and the remote station determines that the response is based on the at least one legacy key by determining that the MAC was calculated using the at least one legacy key.

6. A remote station, comprising:
    means for providing at least one legacy key associated with a second security context, wherein a first security context of a current serving network node includes a security property that is not supported by the second security context;
    means for generating at least one session key, in accordance with the first security context, based on a calculation using a root key and using an information element associated with the first security context;
    means for forwarding a first message to a new serving network node, wherein the first message includes the information element signaling associated with the first security context;
    means for receiving, in response to the first message, a second message from the new serving network node, wherein the second message has a response based on either the at least one legacy key or the at least one session key;
    means for determining that the new serving network node does not support the first security context if the response of the second message is based on the at least one legacy key; and
    means for protecting communications based on the at least one legacy key upon determining that the new serving network node does not support the first security context.

7. The remote station of claim 6, wherein the information element comprises a count value.

8. The remote station of claim 6, wherein the first security context is an enhanced UMTS security context, and the second security context is a legacy security context.

9. A remote station, comprising:
    a processor configured to:
        provide at least one legacy key associated with a second security context, wherein a first security context of a current serving network node includes a security property that is not supported by the second security context;
        generate at least one session key, in accordance with the first security context, based on a calculation using a root key and using an information element associated with the first security context;
        forward a first message to a new serving network node, wherein the first message includes the information element associated with the first security context;
        receive, in response to the first message, a second message from the new serving network node, wherein the second message has a response based on either the at least one legacy key or the at least one session key;
        determine that the new serving network node does not support the first security context if the response of the second message is based on the at least one legacy key; and
        protect communications based on the at least one legacy key upon determining that the new serving network node does not support the first security context.

10. The remote station of claim 9, wherein the information element comprises a count value.

11. The remote station of claim 9, wherein the first security context is an enhanced UMTS security context, and the second security context is a legacy security context.

12. A non-transitory computer-readable storage medium, comprising:
    code for causing a computer to provide at least one legacy key associated with a second security context, wherein a first security context of a current serving network node includes a security property that is not supported by the second security context;
    code for causing a computer to generate at least one session key, in accordance with the first security context, based on a calculation using a root key and using an information element associated with the first security context;
    code for causing a computer to forward a first message to a new serving network node, wherein the first message includes the information element associated with the first security context;
    code for causing a computer to receive, in response to the first message, a second message from the new serving network node, wherein the second message has a response based on either the at least one legacy key or the at least one session key;

code for causing a computer to determine that the new serving network node does not support the first security context if the response of the second message is based on the at least one legacy key; and code for causing a computer to protect communications based on the at least one legacy key upon determining that the new serving network node does not support the first security context.

13. The non-transitory computer-readable storage medium of claim 12, wherein the information element comprises a count value.

14. The non-transitory computer-readable storage medium of claim 12, wherein the first security context is an enhanced UMTS security context, and the second security context is a legacy security context.

* * * * *